United States Patent Office 3,259,546
Patented July 5, 1966

1

3,259,546
TREATMENT OF VIRUSES

John R. Polley, Ottawa, Ontario, Canada, assignor to Canadian Patents and Development Limited, Ottawa, Ontario, Canada, a company of Canada No Drawing. Filed June 1, 1962, Ser. No. 199,250
4 Claims. (Cl. 167—78)

This invention relates to the preparation of vaccines suitable for immunization against virus infections. Virus suspensions containing certain protective agents are subjected to controlled doses of ionizing radiation.

Vaccines have been prepared from infective viruses by chemical inactivation using formaldehyde, ethylene oxide, β-propiolactone, or similar compounds. A combination of this chemical treatment with ultra-violet or ultra-sonic irradiation has been used. Inactivation with ultra-violet, ultra-sonic, high speed electron or gamma radiation has previously been investigated. By the above treatments it has been difficult in practice to consistently arrive at complete destruction of the infectivity while retaining a large percentage of the antigenicity. Treatments with ionizing radiation in the past gave unpredictable results—the complete inactivation was not consistently related to the radiation dose, and the antigenicity was often destroyed at an equal or greater rate than the infectivity. When the infectivity has not been completely destroyed by the initial treatment it has been practically impossible to re-treat without also destroying a significant amount of the antigenicity. Wastage of batches in the preparation of some vaccines from live virus, has been significant. The prior methods have not made feasible the preparation of vaccines from all types of viruses.

An object of this invention is to prepare vaccines from various live viruses by completely destroying the infectivity while consistently retaining the antigenicity. Another object is to provide a controlled process for preparing vaccine from live virus, utilizing ionizing radiation. A further object is to protect the antigenicity of the virus during irradiation. A still further object is to provide a virus composition containing certain protective agents for the antigenicity.

It has now been found that it is possible to apply an additional calculated dose of ionizing radiation to destroy any residual infectivity remaining after the initial irradiation. It has now been found according to the invention that, in the presence of certain chemicals, the rate of destruction of antigenicity on irradiation is significantly, and consistently, lower than the rate of destruction of the infectivity. The radiation dose can be controlled to just completely destroy the infectivity and yet consistently retain the antigenicity. The permissible excess over the required dose, before the antigenicity is significantly lowered, is broad enough to allow effective control in commercial practice.

Any ionizing radiation, such as X, γ, β, or electron radiation, may be used. It is presently preferred to use gamma radiation such as that produced by a commercially available cobalt-60 irradiator. The radiation dose (to completely destroy the infectivity) is usually within the range from about $0.5\times10^6$ to about $6\times10^6$ rads, depending on the particular virus, virus concentration, protective agent, and protective agent concentration used.

The protective agents desirably are water soluble to an effective concentration, easy to handle, and have no undesirable effect on the virus antigenicity. Also the agents desirably have no serious physiological toxicity at the concentrations involved, and leave no toxic amounts of irradiation byproducts. When used hereinafter "non-toxic" has the meaning defined in the previous sentence.

2

The additives which have been found to protect the antigenicity in preference to the infectivity are compounds which also are antioxidant in nature, or preferably combine with nascent oxygen or oxidizing agents produced in the system. Alternatively the additives may act primarily as free radical scavengers, or be effected preferentially by free radicals, and selectively transmit the "energy" involved. The compounds should be not easily decomposed, and preferably capable of resonance or existance in different tautomeric forms. Suitable compounds include certain sulphur-containing amino-acids, aromatic ring compounds having at least two polar substituent groups, heterocyclic compounds having unsaturation, unsaturated hydroxy acids and mixtures thereof. Illustrative compounds are cystine, histidine, tryptophan, tyrosine, allantoin, phenylalanine, alkali metal p-amino-hippurate, sulphanilamide, and ascorbic acid. The free acids or non-toxic salts of the various carboxylic acids may be used provided that the pH of the system is maintained above about 5. Aniline and pyridine exert a protective action but are physiologically undesirable. Cysteine and methionine produced unpleasant odours suggesting the rupture of carbon-sulphur bonds, but are otherwise good protective agents. Histidine and sodium p-amino-hippurate are presently preferred for influenza and mumps viruses respectively.

The concentration of the protective agent in the virus suspension may range from about 0.01 to about 1% (wt./vol.). As the concentration is increased the radiation dose required to destroy the infectivity increases. The concentration limits are not critical and some variation above or below the given limits may be tolerated. The preferred concentration is constant and within the range 0.05 to 0.3%. If the concentration used is too high, the radiation dose required will be excessive.

The suspension of the live virus is obtained in any suitable manner. It may be desirable to purify the initial suspension if impurities are present which will cause a non-uniform unpredictable radiation dose-infectivity relationship. Suspensions of the larger viruses are readily purified by centrifugation and resuspension. Other methods are known to those skilled in the art. In some instances an unpurified suspension in selected tissue culture medium can be used directly. The media for these suspensions are usually aqueous saline solutions or liquids suitable for inoculation. For control and optimum efficiency of the process it has been found desirable to provide a selected standardized protective agent system for each virus, giving a known infectivity=radiation dose curve (and allowing ready calculation of any supplementary dose required). This may involve the use of a selected culture medium, or purification of the virus-containing suspension followed by addition of effective amounts of a selected agent or synergistic combinations thereof. These steps may be done singly or in combination.

The protective action of various chemical additives on the antigenicity of influenza A virus is illustrated. Virus suspensions were prepared by centrifuging freshly harvested allantoic fluid containing influenza A (PR8) virus at 10,000 r.p.m. for one hour (8700 g.). The sediment was resuspended in saline to produce a hemagglutination titer of about 1:2560 per ml. In a few instances initial titers of about 1:5120 or 1:10,240 were used. However, the decreased titers after irradiation rapidly become similar as the dose is increased.

For irradiation 10 ml. samples of these suspensions were placed in small glass vials with plastic screw caps. The vials were irradiated in a cobalt=60 Gammacell 220 irradiator (Commercial Products Division, Atomic Energy of Canada Limited) at a dose rate of $1.25\times10^6$ rads/hour. After various exposure times the vials were stored overnight at 4° C. and then tested for infectivity and hemagglutination titer (as described in Can. J. Microbiol, 1, 256–61, 1955). The hemagglutination titer is taken as a good measure of the antigenicity for these pneumotropic viruses. A titer of greater than about 1:300 is usually necessary for human vaccines. Other tests may be used for the antigenicity, including observation of inoculated animals, as are known in the art.

*Example I*

The hemagglutinin (units per ml.) after various radiation doses in the presence of various reagents are listed in Table I. The reagents were added to samples of virus saline suspension described above to give a concentration of 0.2%. With few exceptions, the infectivity was destroyed at doses of $1\times10^6$ rads or greater. For consistent safe vaccine production with this virus a dose of at least about $1\times10^6$ rads and a hemagglutinin of at least about 300, are necessary.

TABLE I.—INFLUENZA A VIRUS—HEMAGGLUTININ UNITS PER ML.

| Reagent Added | Radiation Dose (rads) | | | | | |
|---|---|---|---|---|---|---|
| | 0 | $0.5\times10^6$ | $1.0\times10^6$ | $2.0\times10^6$ | $3.0\times10^6$ | $4.0\times10^6$ |
| 0 (Control) | 2,560 | <20 | <20 | <20 | <20 | <20 |
| Cystine | 2,560 | 2,560 | 2,560 | 640 | 160 | <20 |
| Cysteine | 2,560 | 2,560 | 2,560 | 2,560 | 320 | 160 |
| Methionine | 5,120 | 5,120 | 2,560 | 2,560 | 1,280 | 320 |
| Histidine | 2,560 | 2,560 | 2,560 | 2,560 | 1,280 | 160 |
| Tryptophan | 2,560 | 2,560 | 1,280 | 320 | <20 | <20 |
| Tyrosine | 5,120 | 2,560 | 2,560 | 320 | <20 | <20 |
| Phenylalanine | 2,560 | 1,280 | 640 | <20 | <20 | <20 |
| Allantoin | 5,120 | 2,560 | 1,280 | 640 | 80 | <20 |
| Sodium p-aminohippurate | 2,560 | 2,560 | 2,560 | 640 | 320 | 40 |
| Sulphanilamide | 5,120 | 2,560 | 1,280 | 640 | 80 | <20 |
| Ascorbic Acid | 2,560 | 2,560 | 1,280 | 320 | <20 | <20 |
| Aniline | 2,560 | 2,560 | 2,560 | 640 | <20 | <20 |
| Pyridine | 2,560 | 1,280 | 1,280 | 160 | <20 | <20 |
| Calf Serum | 5,120 | 2,560 | 320 | <20 | <20 | <20 |
| Bovine Albumin | 2,560 | 2,560 | 320 | <20 | <20 | <20 |
| Peptone | 2,560 | 1,280 | 160 | <20 | <20 | <20 |
| Gelatin | 2,560 | 160 | <20 | <20 | <20 | <20 |
| Glucose | 2,560 | 160 | <20 | <20 | <20 | <20 |
| Sucrose | 2,560 | 160 | <20 | <20 | <20 | <20 |
| Inulin | 2,560 | 80 | <20 | <20 | <20 | <20 |
| Proline | 2,560 | 1,280 | 160 | <20 | <20 | <20 |
| Uracil | 2,560 | 2,560 | 160 | <20 | <20 | <20 |
| Arginine | 2,560 | 1,280 | <20 | <20 | <20 | <20 |
| Glycine | 2,560 | 640 | <20 | <20 | <20 | <20 |
| Urea | 2,560 | 1,280 | 160 | <20 | <20 | <20 |
| Quinhydrone | 2,560 | <20 | <20 | <20 | <20 | <20 |
| Allyl Alcohol | 2,560 | 640 | 320 | <20 | <20 | <20 |

In Table I, the compounds below ascorbic acid are not suitable protective agents for the hemagglutinin. Phenylalanine offered protection up to $1\times10^6$ rads and could be used in some instances. Carbohydrates such as glucose, sucrose, and inulin had little effect. Proteins such as calf serum and bovine albumin afforded only a small measure of protection. Simple straight-chain amino acids, not containing sulphur, such as glycine and arginine had a relatively small effect.

*Example II*

The hemagglutinin and infectivity of influenza A virus was measured for various gamma radiation doses and for various concentrations of histidine and sodium p-aminohippurate (PAH). The results are shown in Table II.

TABLE II.—INFLUENZA A VIRUS—HEMAGGLUTININ UNITS PER ML.

| Radiation Dose (rads) | Control 0 | Histidine Concentration | | | PAH Concentration | | |
|---|---|---|---|---|---|---|---|
| | | 0.05% | 0.2% | 0.8% | 0.05% | 0.2% | 0.8% |
| 0 | 5,120 | 5,120 | 5,120 | 5,120 | 5,120 | 5,120 | 10,240 |
| $0.25\times10^6$ | 2,560 | 5,120 | 5,120 | 5,120 | 5,120 | 5,120 | 10,240 |
| $0.5\times10^6$ | [1] 160 | [1] 5,120 | 5,120 | 5,120 | 5,120 | 5,120 | 10,240 |
| $1.0\times10^6$ | [1] 0 | [1] 2,560 | [1] 5,120 | 5,120 | [1] 2,560 | 5,120 | 10,240 |
| $2.0\times10^6$ | ---------- | [1] 1,280 | [1] 2,560 | [1] 5,120 | [1] 640 | [1] 1,280 | [1] 10,240 |
| $4.0\times10^6$ | ---------- | [1] 40 | [1] 320 | [1] 1,280 | [1] 40 | [1] 160 | [1] 1,280 |
| $6.0\times10^6$ | ---------- | [1] <20 | [1] <20 | [1] 80 | [1] <20 | [1] <20 | [1] <20 |

[1] The virus suspension was non-infective at this dose and concentration.

From Table II it is evident that as the concentration is increased the dose required to completely destroy the infectivity is increased. At the lower concentrations of PAH the hemagglutinin was significantly decreased before the infectivity was destroyed. The histidine was effective over the range of concentrations shown and permitted considerable excess radiation before the hemagglutinin was seriously affected. About 0.1% histidine is preferred for this influenza virus. The PAH has been found to be more advantageous with mumps virus. The ratio of the radiation dose completely removing the infectivity, to the removing the hemagglutinin, for the histidine-influenza A system, is about 0.2. In general this ratio should be less than about 0.7.

The infectivity and antigenicity decrease approximately exponentially with increase in radiation dose, for most viruses. The infectivity can be reduced to approximately the same extent regardless of whether the radiation is administered as a single dose or in divided doses. From the initial rate of the virus inactivation it is possible to calculate the radiation dose required to destroy the infectivity. If a given dose has been insufficient the suspension can be subjected to a further dose, the amount of which can be exactly calculated from the known complete inactivation curve for the system involved. The inactivation commences and ceases almost simultaneously with the commencement and cessation of irradiation. The rate of irradiation or dose rate is of minor importance—the total dose being most significant.

The mechanism of the inactivation is not understood but is believed to be largely an indirect chemical effect and not a primary result of the radiation per se. It may be that free radicals produced transfer their energy via chemical intermediaries exerting an oxidizing action. The protective agents of the invention appear to counteract the oxidizing action or intercept the energy transfer from free radicals or both, preferentially for the antigenic component.

The process of this invention may be used to prepare vaccines from various viruses. Suitable protective agents, type of ionizing radiation and radiation dose will be readily ascertainable by one skilled in the art from the above teachings. The above examples are illustrative only and are not intended to limit the invention which is defined in the appended claims.

I claim:

1. A process for destroying infectivity by irradiating aqueous suspensions of infective virus selected from the group consisting of influenza and mumps, comprising adding to the suspension a protective agent for the virus antigenic component selected from the group consisting of cystine, cysteine, methionine, histidine, tryptophan, tyrosine, phenylalanine, allantoin, p-aminohippuric acid, sulphanilamide, ascorbic acid and non-toxic salts of the acids, in an effective amount from about 0.05 to about 0.08% wt./vol., irradiating with gamma radiation until the infectivity is destroyed, the radiation dose being within the range $1 \times 10^6$ to $6 \times 10^6$ rads, and recovering virus suspensions having a hemagglutinin (units/ml.) of at least about 300, and suitable for vaccine preparation.

2. A process for destroying infectivity by irradiating aqueous suspensions of infective mumps virus, comprising adding to the suspension a protective agent for the mumps virus antigenic component consisting essentially of sodium p-aminohippurate in an effective amount from about 0.05 to 0.8% wt./vol., irradiating with gamma radiation until the infectivity is destroyed, the radiation dose being within the range $1 \times 10^6$ to $6 \times 10^6$ rads and recovering suspensions having a hemagglutinin (units/ml.) of at least about 300 and suitable for vaccine preparation.

3. A process for destroying infectivity by irradiating aqueous suspensions of infective influenza virus, comprising adding to the suspension a protective agent for the influenza virus antigenic component consisting essentially of histidine, in an effective amount from about 0.05 to 0.8% wt./vol., irradiating with gamma radiation until the infectivity is destroyed, the radiation dose being within the range $1 \times 10^6$ to $6 \times 10^6$ rads, and recovering suspensions having a hemagglutinin (units/ml.) of at least about 300 and suitable for vaccine preparation.

4. A process for destroying infectivity by irradiating purified aqueous saline suspensions of infective influenza A (PR8) virus, comprising adding to the suspension a protective agent for the influenza virus antigenic component consisting essentially of histidine, in an effective amount from about 0.1 to 0.3% wt./vol., irradiating with gamma radiation until the infectivity is destroyed, the radiation dose being within the range $1 \times 10^6$ to $4 \times 10^6$ rads, and recovering suspensions having a hemagglutinin (units/ml.) of at least about 300 and suitable for vaccine preparation.

References Cited by the Examiner

UNITED STATES PATENTS

| | | | |
|---|---|---|---|
| 2,421,382 | 6/1947 | Levinson et al. | 167—78 |
| 2,445,301 | 7/1948 | Chambers | 167—78 |
| 3,019,168 | 1/1962 | Taylor | 167—78 |
| 3,031,378 | 4/1962 | Ishidate et al. | 167—78 |
| 3,060,094 | 10/1962 | Dutcher et al. | 167—78 |
| 3,061,518 | 10/1962 | Averswald et al. | 167—78 |
| 3,065,139 | 11/1962 | Ericsson | 167—72 |
| 3,076,748 | 2/1963 | Lo Grippo et al. | 167—78 |
| 3,105,011 | 9/1963 | McLean et al. | 167—78 |

OTHER REFERENCES

Jordan et al., "Inactivation of Some Animal Viruses With Gamma Radiation From Cobalt-60," Proc. Soc. Exp. Biol. Med., 91(2): 212–215, February 1956.

Rivers et al., "Viral and Rickettsial Infections of Man," 3rd Ed., pp. 32–34, 39–42, 105–112, 162–168, 215–216, 224–226, 239–246, 502–504, 575–576, 643–646, 783, 786–787, published 1959 by J. B. Lippincott, Philadelphia, Pa.

LEWIS GOTTS, *Primary Examiner.*

S. K. ROSE, *Assistant Examiner.*